March 24, 1970     P. A. DEMERS ET AL     3,501,775
BELT CONSTRUCTION AND METHOD OF MAKING SAME
Filed July 16, 1968     3 Sheets-Sheet 1
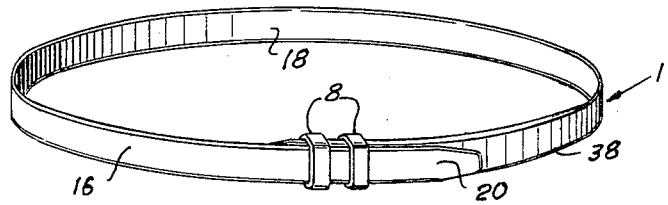
Fig. I
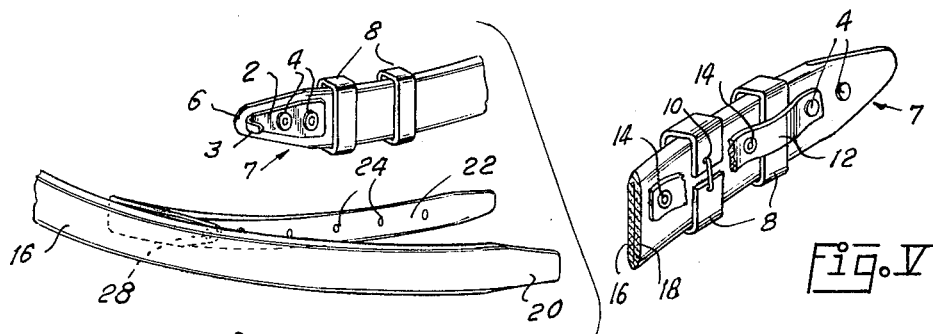
Fig. II     Fig. V
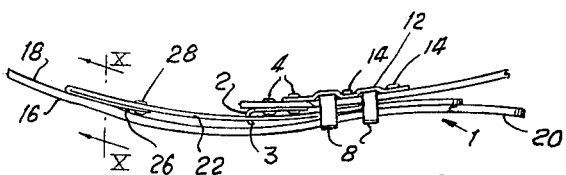
Fig. VI
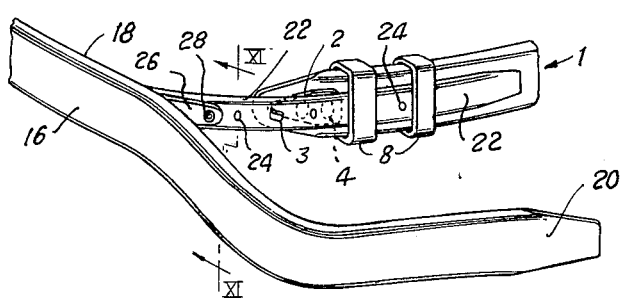
Fig. III
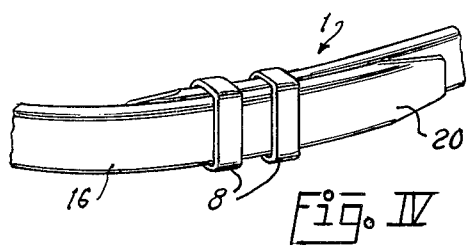
Fig. IV
INVENTORS
Phillip A. Demers
BY William J. Moon
Howard E. Moore
ATTORNEY March 24, 1970 P. A. DEMERS ET AL 3,501,775
BELT CONSTRUCTION AND METHOD OF MAKING SAME
Filed July 16, 1968 3 Sheets-Sheet 2
Fig. VII
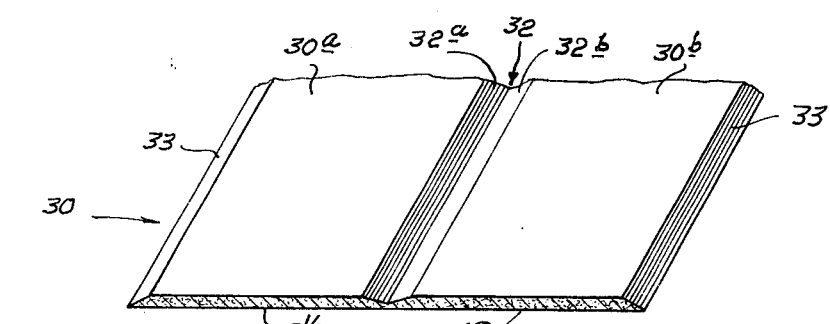
Fig. VIII
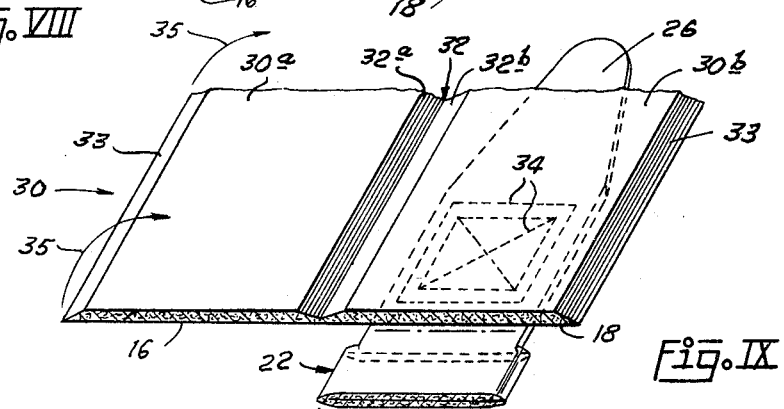
Fig. IX
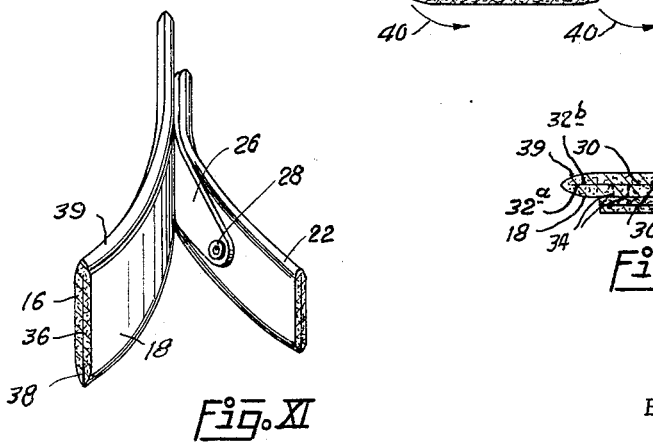
Fig. XI
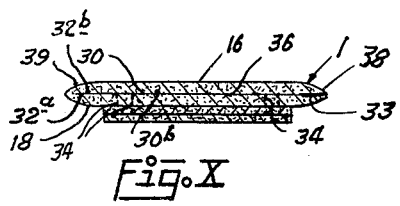
Fig. X
INVENTORS
Phillip A. Demers
BY William J. Moon
Howard E. Moore
ATTORNEY

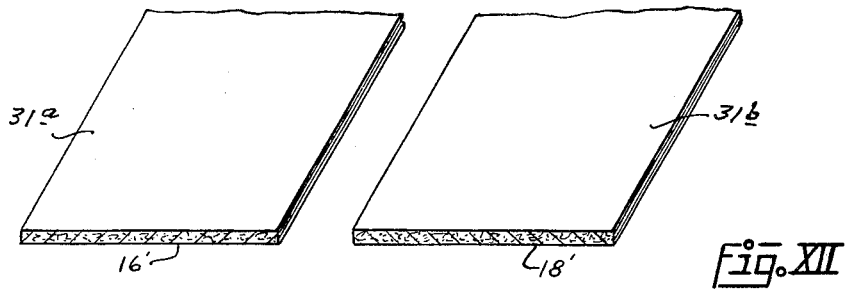
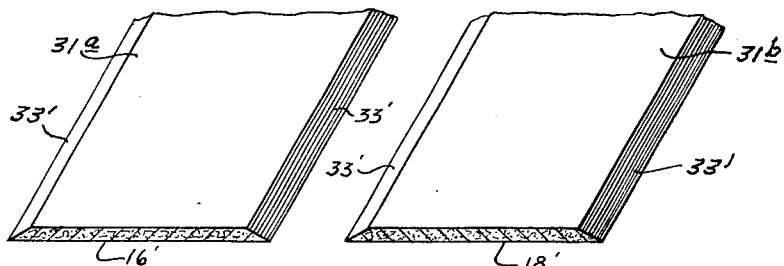
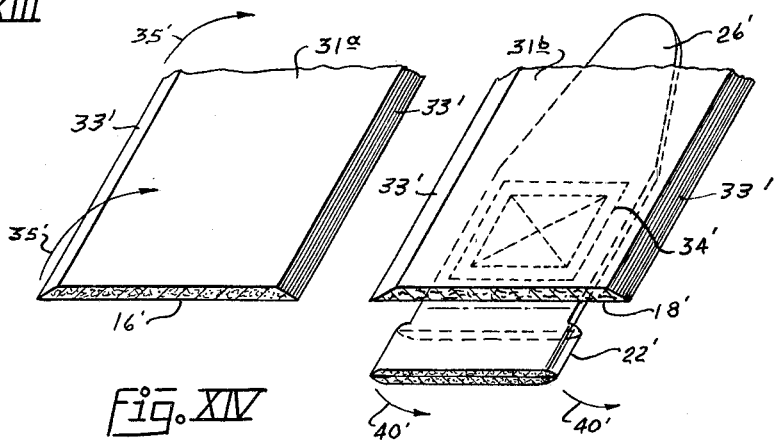
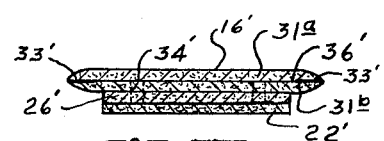
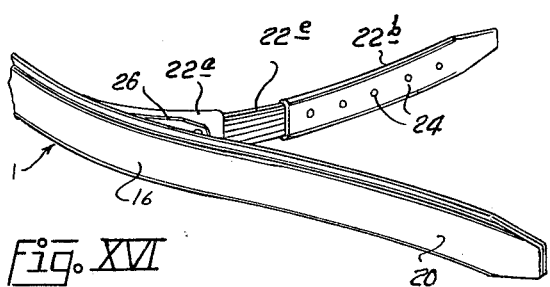
INVENTORS
Phillip A. Demers
BY William J. Moon
ATTORNEY

United States Patent Office 3,501,775
Patented Mar. 24, 1970

3,501,775
BELT CONSTRUCTION AND METHOD OF MAKING SAME
Phillip A. Demers and William J. Moon, both of 7509 Inwood Road, Dallas, Tex. 75209
Filed July 16, 1968, Ser. No. 745,182
Int. Cl. A41f 9/00
U.S. Cl. 2—321                                14 Claims

ABSTRACT OF THE DISCLOSURE

A belt and method of making same wherein the ends of the belt are joined without the use of a buckle or other joinder member engaged with the belt body proper, and no attachment member or stitching is exposed on the outer side of the belt.

BACKGROUND OF THE INVENTION

The belt construction embodying the present invention is an improvement over a belt construction of the type disclosed in U.S. Patent No. 2,885,685, issued May 12, 1959.

As pointed out in the aforementioned patent, belts having no buckle are appealing to workmen because the elimination of conventional buckles lessens the possibility of marring or scratching the surface finish of articles such as automobiles, furniture and the like about which they work and as a safety factor in preventing engagement with machinery.

Belts without buckles are more durable, last longer and retain an attractive appearance longer than belts having conventional buckles.

The belt construction disclosed in the aforementioned patent, while offering a significant improvement over the prior art, offered an imperfect solution to existing problems in that unsightly stitching utilized in the belt construction was exposed on the outer side of the belt and therefore, detracted from the appearance thereof.

For the sake of appearance, a minimum number of stitches, which were exposed to the outer surface of the belt were employed, resulting in weak construction, requiring frequent repairs. To repair the belt often resulted in an unsightly appearance and weakening of the body of the belt because numerous holes were punched therein when the tongue was replaced in addition to holes which were already in the outer surface of the belt as a result of the initial construction.

Holes in the outer surface of the belt, having stitching threads passing therethrough, had a tendency to collect grease and other foreign matter which resulted in an unsightly appearance and deterioration of the body of the belt because the interior portion thereof is not treated in the manner as the outer surface which was highly resistant to undesirable substances.

Weakening of the outer portion of the body of the belt also resulted in creasing and wrinkling thereby reducing the attractiveness of the belt and reducing the life thereof.

SUMMARY OF THE INVENTION

We have developed an improved belt construction and a method for making same wherein the belt has no buckle or stitching exposed to the outside thereof.

Since all stitching is completely concealed, a sufficient quantity of stitching may be utilized without detracting from the appearance of the belt to provide great structural strength.

Briefly stated the method of construction consists of sewing or otherwise securing the tongue to an inner layer of the belt, which is constructed of two layers, and then connecting the inner and outer layers of material to conceal the stitching or other securing means.

It is a primary object of the present invention to provide a belt which has no holes or openings in the surface of the outside thereof.

A further object of the invention is to provide a belt having no buckle or other attachment means which can come in contact with machinery, automobile bodies or other objects which the wearer might be required to service, operate or otherwise come in contact with.

Another object of the invention is to provide a belt the outside of which is completely sealed thereby eliminating the possibility of grease or other harmful material passing through openings in the outer surface of the belt to rot or otherwise cause deterioration of the inside thereof.

A further object of the invention is to provide a belt which is particularly attractive and which retains its attractiveness for a long period of time.

These and other objects are effected by our invention as will be apparent in the following description taken in conjunction with the accompanying drawings.

DESCRIPTION OF THE DRAWINGS

The accompanying drawings illustrating the present invention are provided so that the invention may be better and more fully understood, in which:

FIGURE I is a perspective view of the belt with the ends thereof connected;

FIGURE II is a fragmentary perspective view of the belt with the ends thereof disconnected;

FIGURE III is a fragmentary perspective view showing the tongue connected to the hook;

FIGURE IV is an enlarged perspective view similar to that illustrated in FIGURE I with the ends of the belt connected;

FIGURE V is an enlarged perspective view of the back of a portion of the belt illustrating details of construction;

FIGURE VI is a top plan view of the belt with the opposite ends thereof connected;

FIGURES VII–XI illustrate a first method of construction of a first embodiment of the belt;

FIGURE VII is a fragmentary perspective view of a piece of leather or other construction material employed in the construction of the belt;

FIGURE VIII is a fragmentary perspective view of the piece of leather or other construction material having a notch cut therein and beveled edges illustrating the appearance of the construction material during the construction process;

FIGURE IX is a perspective view of the piece of construction material having a tongue sewn thereto;

FIGURE X is a cross sectional view taken along lines X—X of FIGURE VI;

FIGURE XI is an enlarged perspective view looking in the direction indicated by the arrows XI—XI in FIGURE III of the drawing.

FIGURES XII–XV illustrate an alternate method of construction of a second embodiment of the belt.

FIGURE XII is a fragmentary perspective view of two pieces of construction material employed in the alternate method of construction of the belt;

FIGURE XIII is a fragmentary perspective view of the two pieces of construction material having beveled edges;

FIGURE XIV is a perspective view of the two pieces of construction material with a tongue or billet sewn to one of the pieces;

FIGURE XV is a cross sectional view similar to FIGURE X of the second embodiment;

FIGURE XVI is a perspective view of the tongue of a third embodiment of the belt having an elastic segment therein.

Numeral references are employed to indicate the various parts shown in the drawings and like numerals indicate like parts throughout the various figures of the drawings.

DESCRIPTION OF A PREFERRED EMBODIMENT

Referring to FIGURES I through VI of the drawing, the numeral 1 generally designates a belt which may be constructed of leather, plastic, rubber, fabric or any other suitable material. A belt intended to be worn by workmen, such as a mechanic, might be constructed of synthetic materials, having properties making it highly resistant to grease and other material which would stain or otherwise mar the appearance of the belt. A belt intended to be worn as a dress belt may be constructed of any of several well-known materials, such as calf or other animal skin.

A hook 2 having an outwardly extending portion 3 is rigidly connected by brads 4 to the attachment end 6 of the body of belt 1. The attachment end 6 of belt 1 may be tapered as indicated at 7 to prevent exposure of unsightly corners when the belt is hooked.

Loops 8 encircle portions of the body of the belt adjacent hook 2 and have opposed ends thereof connected by staples 10. A keeper strap 12 is connected to the body of the belt by brads 4 and 14 covering staples 10 and portions of loops 8 and holding said loops in a desired position relative to the hook end 6 of the belt 1.

Belt 1 has an outer exposed surface 16 and an inner surface 18 with hook end 6 and tip 20 disposed at opposite ends thereof.

A tongue 22, having spaced holes 24 disposed along the length thereof for receiving hook 2, has a flap portion 26 sewn to a portion of the back 18 of the belt, spaced from tip 20 thereof, as will be hereinafter more fully explained. Flap 26 is securely connected to the body portion of tongue 22 by a brad 28.

Referring to FIGURES III, IV and VI, the opposite ends of belt 1 may be connected by inserting tongue 22 through loops 8 and positioning outwardly extending portion 3 of hook 2 in one of the spaced holes 24. Tip 20 of belt 1 is placed through loops 8, thereby covering tongue 22, forming a smooth neat connection in which no buckle or threads are exposed when the belt is being worn, as shown in FIGURE I.

Discussion of a preferred method of constructing the belt hereinbefore described will be directed to FIGURES VII through XI of the drawing.

As illustrated in FIGURE VII an elongated strip 30 of leather or other belt material is provided.

A portion of the belt material is cut away from strip 30, forming an elongated V-shaped groove 32 along a central portion thereof.

A bevel 33 is formed along opposite edges of strip 30, each of said bevels 33 being in spaced apart parallel relation to groove 32 with surfaces 30a and 30b lying therebetween.

For constructing a belt of rubber, plastic or synthetic materials we anticipate the use of suitable dies whereby strip 30 may be formed or extruded having groove 32 and bevels 33 formed therein in a continuous operation.

Groove 32 and bevels 33 may be formed in strip 30 in any desired sequence by any suitable process, such as cutting, forming, extruding, molding and the like without departing from the general concept hereinbefore described.

Flap 26 of tongue 22 is securely connected by stitching 34 through surface 30b of strip 30. It should be obvious that brads or other suitable connectors could be used in lieu of or in conjunction with stitching 34 for connecting tongue 22 to the body of the belt.

After flap 26 of tongue 22 has been sewn through surface 30b to back 18 of the belt, suitable adhesive material, such as rubber cement, is applied to surfaces 30a, 30b, groove 32 and beveled surfaces 33 of strip 30. Strip 30 is then folded along groove 32 in the direction indicated by arrows at 35 in FIGURE IX and pressed together as by passing between rollers, forming a cross-section as illustrated in FIGURE X.

Surfaces 32a and 32b of groove 32, surfaces 30a and 30b, and beveled surfaces 33 are integrally connected by the adhesive material forming a joint 36 whereby stitches of thread or other connecting means 34 are concealed and to not extend through the outer surface 16 of belt 1.

Folding strip 30 as hereinbefore described, and pressing to together forms smooth tapered edges 38 and 39 along the upper and lower edges of belt 1.

Tongue 22 is folded in the direction indicated by arrows 40 in FIGURE IX and brad 28 is utilized for connecting the end of flap 26 to the body of tongue 22. It should be readily apparent that thus folding tongue 22 conceals stitching 34 on the inner surface of tongue 22.

Since threads of stitching 34 are completely concealed, both inside and outside, sufficient quantities and configuration of seams may be provided for securely connecting tongue 22 to the inner surface 18 of belt 1 without detracting from the appearance thereof.

From the foregoing it should be readily apparent that we have developed an improved method of constructing belts which have no buckle or stitching exposed to the outer surfaces thereof yet has a strong, durable construction.

Referring to FIGURES XII–XV of the drawings illustrating the method of constructing the second embodiment of the belt, two strips 31a and 31b of flexible construction material are provided.

Each strip 31a and 31b has a beveled edge 33' formed along opposite edges thereof. Tongue 22' is connected to one of the strips 31b by suitable connecting means, such as stitches 34'.

After flap 26' of tongue 22' has been connected to one of the strips 31b adhesive is placed on the strips and they are pressed together as hereinbefore described with respect to the method of construction employed in making the first embodiment of the belt.

Referring to FIGURE XVI, an elastic segment 22e may be provided in tongue 22 to allow expansion of the belt. Elastic segment 22e is connected between a first section 22a of tongue 22 having flap 26 connected thereto and a second section 22b having holes 24 extending therethrough.

It should be obvious that providing a spring or other resilient means between hook 2 and the belt body is an alternate means for achieving the result accomplished by provision of elastic segment 22e The methods of construction are simple and inexpensive to perform and may be employed in the manufacture of belts for fashion design for the general public or for workmen.

The methods of construction, when utilized for making belts for workmen, result in a belt which is impervious to grease or other substances which may cause the belt to deteriorate.

The primary advantage derived from employing the methods hereinbefore described is to provide a belt of fashion design for the general public, combining an attractive general appearance and a strong durable construction.

Having described our invention, we claim:

1. A belt construction comprising, a body of flexible material formed by inner and outer layers of material secured together; a tongue of flexible material; connecting means between the inner layer of the body and one end of the tongue in spaced relation from one end of the body, said connecting means being affixed before securing the outer and inner layers together to thereby conceal the connecting means under the outer layer; disengageable attachment means between the tongue and the other end of the body; at least one loop encircling the body adapted to receive the free end of the tongue and the free end of the body with the free end of the body in overlying relationship to the tongue to thereby conceal the attachment means.

2. The combination called for in claim 1 wherein the connecting means comprises stitches of thread.

3. The combination called for in claim 1 wherein the attachment means is a hook on the end of the body and spaced holes in the tongue adapted to receive the hook.

4. The combination called for in claim 1 wherein the connecting means between the tongue and the inner layer of the body is in spaced relationship to the end of the tongue, the tongue is folded back upon itself and the end of the tongue is secured to the body of the tongue, thereby concealing the connecting means.

5. A method of making a belt comprising the steps of: providing first and second layers of flexible material; connecting a flexible tongue to the first layer in spaced relationship to one end thereof; and securing together the first and second layers to conceal the connection between the first layer and the tongue under the second layer.

6. The method called for in claim 5 wherein the tongue and layer are connected by stitching.

7. A method of making a belt comprising the steps of: providing first and second layers of flexible material; sewing a portion of a flexible tongue to the first layer of flexible material in spaced relationship to one end of the first layer, wherein the tongue is sewn to the first layer in spaced relation to one end of the tongue; securing together the first and second layers of flexible material to conceal the stitching connecting the first layer of flexible material and the tongue by the second layer of flexible material; and folding the tongue upon itself and securing the end of the tongue to the first layer such that the second layer and folded tongue conceal the stitches from the inside and the outside of the belt.

8. The method called for in claim 7 with the addition of the step of securing at least one loop on the belt adjacent the end remote from the place of attachment of the tongue.

9. The method called for in claim 8 with the addition of the step of securing a hook to the end of the belt adjacent the loop.

10. The method called for in claim 5 with the addition of the step of forming beveled edges on opposite sides of the layers before securing the layers together.

11. The method called for in claim 5 wherein the layers are integrally joined by a central groove and the layers are folded about the groove to secure them together.

12. A method of making a belt comprising the steps of: providing a strip of flexible material; connecting a flexible tongue to the strip of material at one side of the longitudinal center line thereof; folding the strip of material along the longitudinal center line thereof; and securing together the adjoining surfaces of the strip to conceal the connection between the strip and the tongue.

13. The combination called for in claim 1 with the addition of elastic means between the body and the attachment means.

14. The combination called for in claim 13 wherein the elastic means is in the tongue between the attachment means and the connecting means.

References Cited

UNITED STATES PATENTS

| 764,999 | 7/1904 | Gallert | 2—321 |
| 1,973,646 | 9/1934 | Mix | 2—338 X |
| 2,175,283 | 10/1939 | Cote | 2—338 X |
| 2,885,685 | 5/1959 | Carr et al. | 2—321 |
| 1,210,083 | 12/1916 | Knower | 2—338 |

MERVIN STEIN, Primary Examiner

G. V. LARKIN, Assistant Examiner